US008123327B2

(12) United States Patent
Casaldaliga et al.

(10) Patent No.: US 8,123,327 B2
(45) Date of Patent: Feb. 28, 2012

(54) METHOD AND APPARATUS TO ADJUST DISTANCE CALCULATIONS

(75) Inventors: Marcos Casaldaliga, Sant Cugat del Valles (ES); Carles Flotats Villagrasa, Barcelona (ES); David Toussaint, Barcelona (ES); Jordi Ferran Cases, Cerdanyola del Valles (ES); Jonas Ingemar Astrom, Järfälla (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 12/569,570

(22) Filed: Sep. 29, 2009

(65) Prior Publication Data

US 2011/0074855 A1 Mar. 31, 2011

(51) Int. Cl.
*B41J 29/393* (2006.01)
*B41J 29/38* (2006.01)
*G01B 11/14* (2006.01)

(52) U.S. Cl. ............................... 347/19; 347/5; 356/614

(58) Field of Classification Search .................... 347/19, 347/23, 5; 356/614
See application file for complete search history.

(56) References Cited

U.S. PATENT DOCUMENTS

| | | | | |
|---|---|---|---|---|
| 6,657,650 | B1 * | 12/2003 | Omelchenko et al. | 347/234 |
| 6,863,363 | B2 | 3/2005 | Yabuta | |
| 7,055,929 | B2 | 6/2006 | Yabuta | |
| 7,391,525 | B2 | 6/2008 | Chapman et al. | |
| 7,556,333 | B2 | 7/2009 | Mitsuzawa | |
| 2008/0253782 | A1 | 10/2008 | Honguh | |
| 2009/0009751 | A1 * | 1/2009 | Taniguchi | 356/121 |

* cited by examiner

*Primary Examiner* — Julian Huffman
*Assistant Examiner* — Jason Uhlenhake
(74) *Attorney, Agent, or Firm* — Gary A. Perry

(57) ABSTRACT

In one embodiment, a distance that a target moves is calculated utilizing an optical sensor. A first temperature of a first portion of the optical sensor is measured at the time of the distance calculation. A second temperature of a second portion of the optical sensor is measured at the time of the distance calculation. The distance is adjusted by a compensation factor that is a function of the first and second temperatures.

20 Claims, 5 Drawing Sheets

METHOD AND APPARATUS TO ADJUST DISTANCE CALCULATIONS

BACKGROUND

In order for a printer to create high-quality images, movement of paper and other types of media through the printer should be precisely measured and controlled. An optical sensor configured to capture images and calculate distances can be used to measure advancement of media in the printer.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

In some printers an optical sensor that measures media advances operates in an environment in which there are significant temperature changes and high temperatures. For example, a printer utilizing latex inks may utilize internal heaters to heat media so as to dry and cure ink on the media. Heating the media can cause the optics of the optical sensor in the printer to deform, resulting in errors in calculated distances. Such distance calculation errors in turn may result in erroneous media advances. The erroneous media advances can lead to gaps, overlaps and banding in printed output and other quality issues.

Embodiments of a method and apparatus to adjust distance calculations were developed in an effort to reduce distance calculation errors attributable to optics deformation in an optical sensor. Embodiments are described with reference to an inkjet printer. The embodiments shown in the accompanying drawings and described below, however, are non-limiting examples. Other embodiments are possible and nothing in the accompanying drawings or in this Detailed Description of Embodiments should be construed to limit the scope of the disclosure, which is defined in the Claims.

Figure 1:
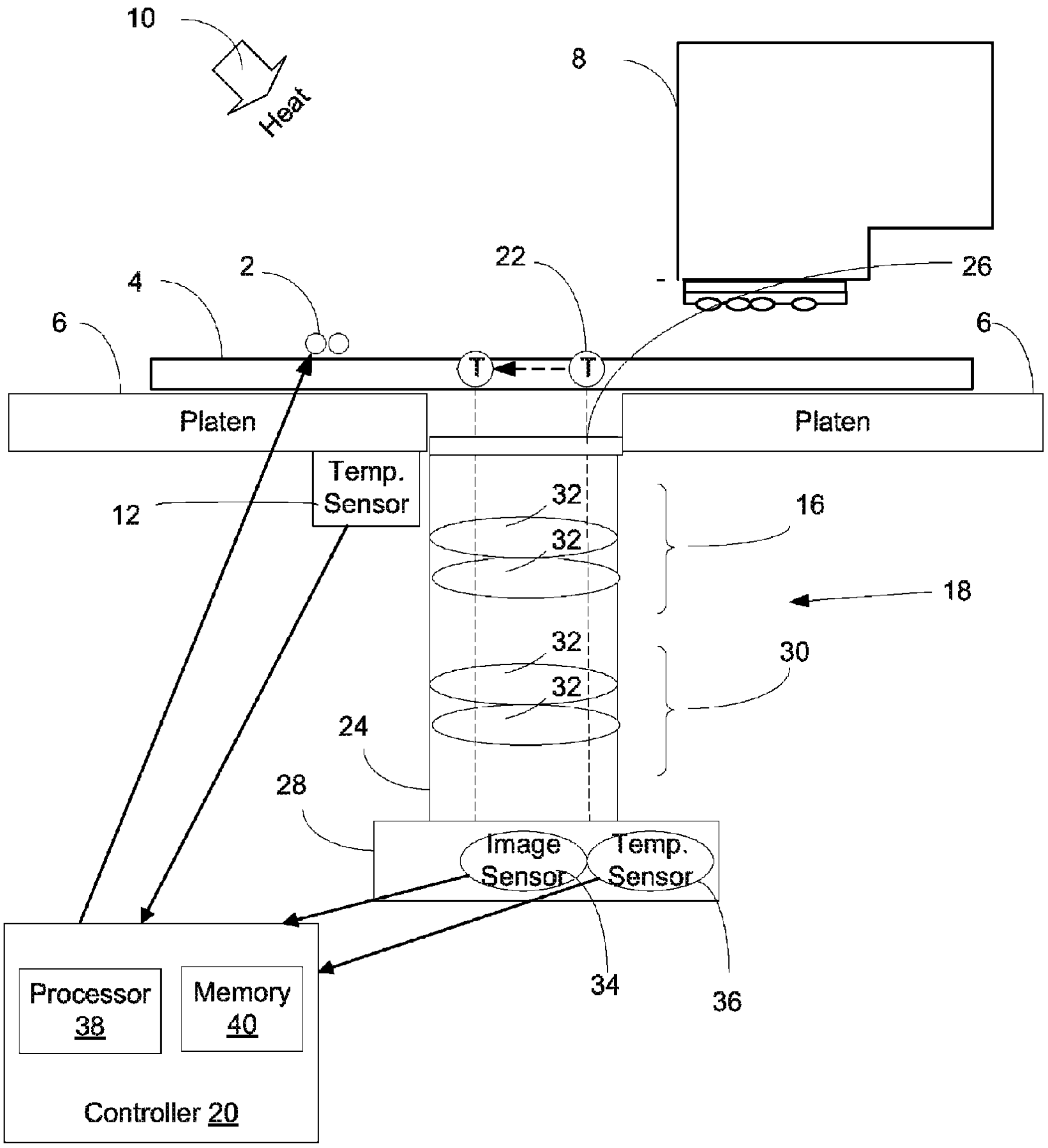
FIG. 1 is a schematic diagram illustrating one embodiment of an apparatus to adjust distance calculations, incorporated in an inkjet printer.

FIG. 1 is a schematic diagram illustrating one embodiment of an apparatus to adjust distance calculations, incorporated in an inkjet printer. In the exemplary embodiment the printer includes a media advance mechanism 2, to transport media 4 over a platen 6 and beneath a printhead 8 that is situated above the platen 6. The printhead 8 is configured to eject droplets of ink onto the media 4. In the exemplary embodiment, the printer includes a heat source 10 situated above the platen 6, to raise the temperature of the media 4 to cause ink that has been ejected onto the media 4 to dry and cure. In an embodiment, the heat source 10 is a heat lamp configured to heat the media 4 to a temperature of approximately fifty-five degrees C. In the exemplary embodiment, a first temperature sensor 12 connects to the underside of the platen 6 to take temperature measurements of a first portion 16 of an adjacent optical sensor 18. The optical sensor 18 and the first portion 16 of the optical sensor are described in detail in the following paragraphs. In the exemplary embodiment, the first temperature sensor 12 electronically connects to a controller 20.

An optical sensor 18 is situated beneath an opening in the platen 6, such that there is a line of sight between the optical sensor 18 and a target 22 on the media 4 to be tracked. In an embodiment a physical aspect of the media 4 constitutes the target 22, such that no printed tracking patterns or artificial marks are required to be made on the media 4. Such physical aspects of the media 4 may include small scale (e.g. microscopic) features in the surface of the media 4. The optical sensor 18 is configured to capture a series of digital images of the target 22 at known intervals that can be sent to a controller 20 for calculating a distance that the target 22 advances. The optical sensor 18 according to this exemplary embodiment includes an optical module 24, a window 26 and an image sensor module 28.

In the exemplary embodiment the optical module 24 includes a first portion 16 and a second portion 30, the first portion 16 being closer to a heat source 10 than the second portion 30. Both the first and second portions hold optics 32 to focus images onto an image sensor 34. The optical module 24 also includes an array of light-emitting diodes (LEDs) to provide adjustable and uniform illumination to the target 22. The window 26 is a hardened transparent surface that allows the LEDs' light to reach the target 22, and allows reflected light to reenter the optical sensor 18. The hardened transparent surface may be in contact with the side of the media 4 that is opposite of the media side that faces the printhead 8. The image sensor module 28 holds an image sensor 34, and electronics that control the operation of the optics 32, the LEDs and the image sensor 34. The image sensor 34 is configured for high-speed digital imaging and fast data transfer. In an embodiment a second temperature sensor 36 is embedded in the image sensor module 28, to take temperature measurements of the second portion 30 of the optical sensor 18. In the exemplary embodiment illustrated in FIG. 1, the second temperature sensor 36 electronically connects directly to the controller 20.

In the exemplary embodiment, the optical sensor 18 electronically connects to the controller 20. The controller 20 is configured to compensate for non-uniform optics deformation by adjusting distance calculations regarding the distance the target 22 travels by a compensation factor that is a function of temperatures measured by the first and second temperature sensors at the time of the distance calculation. The controller 20 in turn utilizes the adjusted distance calculations to precisely control the printer's media advance mechanism 2. As used in this specification and the appended claims, "controller" suggests a processor 38 and a memory 40. The processor 38 may represent multiple processors, and the memory 40 may represent multiple memories. In an embodiment, the controller may include a number of software components that are stored in a computer-readable medium, such as memory, and are executable by processor. In this respect, the term "executable" means a program file that is in a form that can be directly (e.g. machine code) or indirectly (e.g. source code that is to be compiled) performed by the processor. An executable program may be stored in any portion or component of memory.

In the preceding paragraphs embodiments are described with reference to an inkjet printer. Other embodiments are possible. In an embodiment the apparatus may be incorporated in a laser printer or any other printer. In an embodiment, the apparatus may be incorporated in a sheet-fed scanning device having a media advance mechanism. In an embodiment, the apparatus may be incorporated in a flatbed scanning device having a mechanism for advancing a scan head. In an embodiment the apparatus may be incorporated in a microscope having a mechanism for advancing a slide or an object to be viewed or measured. In an embodiment the apparatus may be incorporated in a precision microelectronic assembly machine having a mechanism for advancing an assembly or components to be placed, assembled or measured.

Figure 2:
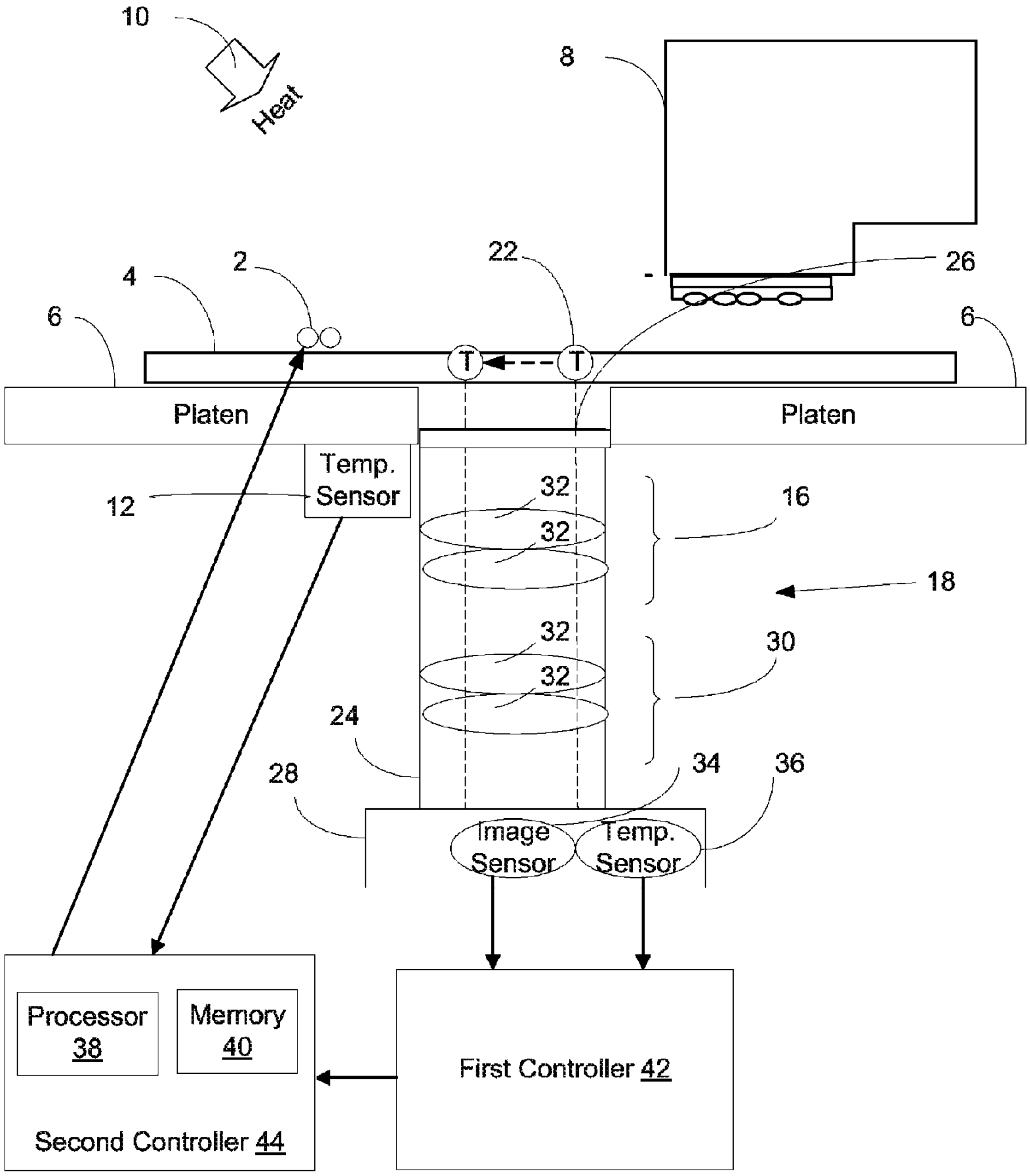
FIG. 2 is a schematic diagram illustrating one embodiment of an apparatus to adjust distance calculations, incorporated in an inkjet printer.

FIG. 2 is a schematic diagram illustrating one embodiment of an apparatus to adjust distance calculations, incorporated in an inkjet printer. The exemplary embodiment is structurally similar to the embodiment illustrated in FIG. 1, except as described in the following two paragraphs.

The exemplary embodiment depicted in FIG. 2 includes and utilizes a first controller 42 and a second controller 44, rather than a single controller 20 as depicted in FIG. 1. In the exemplary embodiment a first controller 42 electronically connects to the image sensor 34, to a second temperature sensor 36 and to a second controller 44. In the exemplary embodiment, the first controller 42 is configured to receive from the optical sensor 18 a series of digital images of the target 22 captured at known intervals, to calculate a distance that the target 22 advances utilizing the images, and to pass the distance calculation to a second controller 44. In the exemplary embodiment, the first controller 42 is also configured to receive temperature measurements of the second portion 30 of the optical sensor 18 from the second temperature sensor 36, and to pass them on to the second controller 44.

In the exemplary embodiment a second controller 44 electronically connects to the first controller 42, to the first temperature sensor 12 and to the media advance mechanism 2. The second controller 44 is configured to receive a distance calculation regarding the distance the target 22 travels, and temperature measurements of the second portion 30 of the optical sensor 18, from the first controller 42. The second controller 44 is also configured to receive temperature measurements of the first portion 16 of the optical sensor 18 from the first temperature sensor 12. The second controller 44 is configured to compensate for non-uniform optics deformation by adjusting the distance calculation by a compensation factor that is a function of temperatures measured by the first and second temperature sensors at the time of the distance calculation. The second controller 44 is additionally configured to in turn utilize the adjusted distance calculations to precisely control the printer's media advance mechanism 2.

In an embodiment, the first temperature sensor could be external to the optical sensor 18, for example coupled to a platen 6, to take temperature measurements of a first portion 16 of the optical sensor 18. In an embodiment, the first temperature sensor could be coupled to, or embedded in, the optical sensor 18. In an embodiment, the second temperature sensor 36 could be coupled to, or embedded in, or external to the optical sensor 18.

Figure 3:
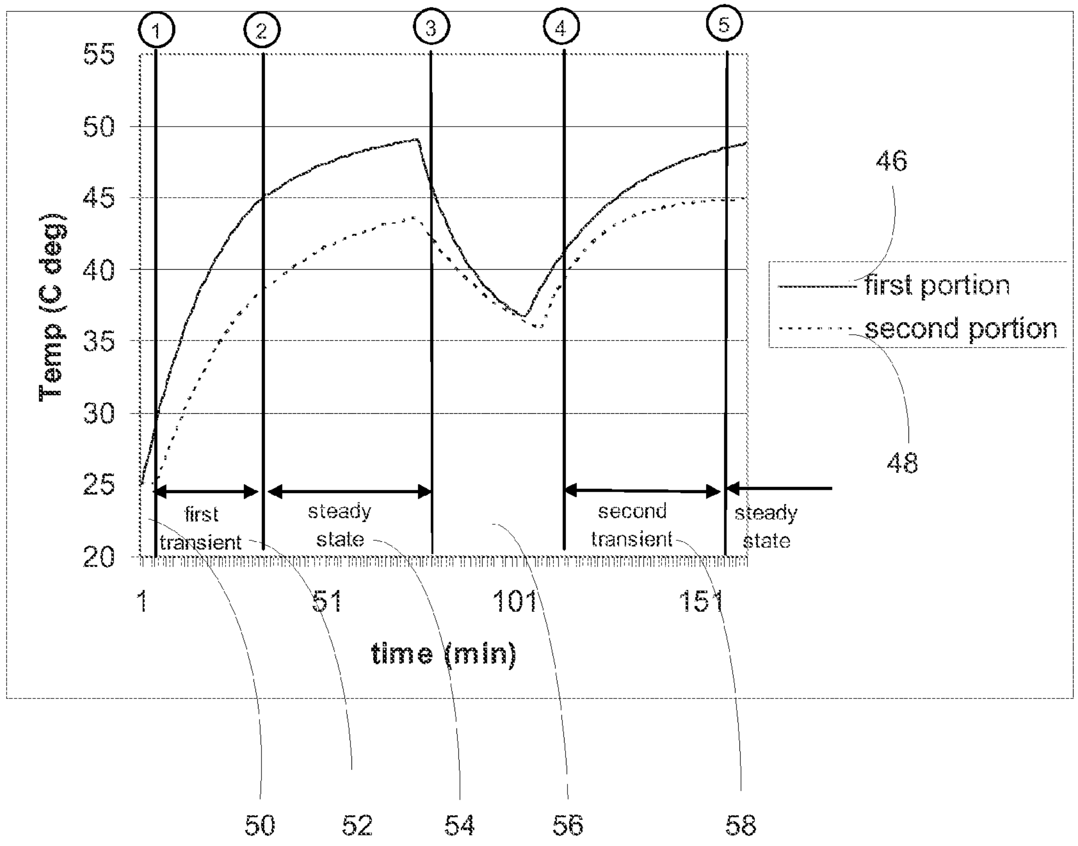
FIG. 3 is a graph depicting example relationships between the temperatures of a first portion of an optical sensor and a second portion of the optical sensor during various thermal states.

FIG. 3 is a graph depicting example relationships between the temperatures of a first portion 46 of an optical sensor and a second portion 48 of the optical sensor during various thermal states. In an embodiment, multiple temperature measurements may be utilized to determine a thermal state of the optical sensor in effect at the time the distance is calculated, the thermal state to be considered when applying a compensation factor to adjust distances.

Determining a thermal state may include a comparison of rates of temperature change within the first and second portions. In an example, temperature readings of the first portion 46 and the second portion 48 of an optical sensor may be analyzed to determine that the optical sensor is in one of the following thermal states: a start-up state 50, a first transient state 52, a steady state 54, a cool-down state 56 and a second transient state 58.

In an embodiment, the start-up state 50 is a state in which the temperatures of the both the first and second portions are lowest and closest to ambient temperature in comparison to the other states, suggesting a device incorporating the optical sensor has just been turned on. In an embodiment, the first transient state 52 is a state following start-up in which the temperatures of the both the first and second portions are increasing, the temperature of the first portion 46 is greater than that of the second portion 48, and the temperature of the first portion 46 is increasing more rapidly than that of the second portion 48. In an embodiment, the steady state 54 is a state in which the temperatures of both the first and second portions are increasing, the temperature of the first portion 46 is greater than that of the second portion 48, and the temperatures of the first and second portions are increasing at approximately the same rate. In an embodiment, the cool-down state 56 is a state in which the temperatures of both the first and second portions are decreasing, suggesting that a device incorporating the optical sensor is in a standby mode in which no heat is being applied and a distance is not being calculated. In an example the temperatures reach a floor of approximately thirty-seven degrees C. during the cool-down state 56. In an embodiment, the second transient 58 is like the first transient state 52 except that it follows a cool-down state 56 rather than start-up, and therefore the difference in the rates of change as between the first and second portions is not as large as in the first transient state 52.

In an embodiment, knowledge of the previous thermal state may be helpful in identifying a current thermal state. For example, when determining whether an optical sensor is in a first transient or a second transient state 58, it may be helpful to have the knowledge that the previous state was a start-up state. In this example, such knowledge of the previous state may help lead to a conclusion that increasing temperature measurements in the first and second portions indicate a first transient state 52.

In an embodiment, a printer's controller may be configured to consider thermal states in applying a compensation factor to adjust distance calculations. In the exemplary embodiment such a controller might utilize a first transient state 52, a steady state 54, and a second transient state 58 to generalize temperature characteristics of the optical sensor at different times as these are states in which printing processes may take place. In this embodiment the controller may not utilize the start-up and cool-down thermal states in applying a compensation factor, as the start-up and cool-down states suggest that the printer that incorporates the optical sensor is in a standby mode.

Figure 4:
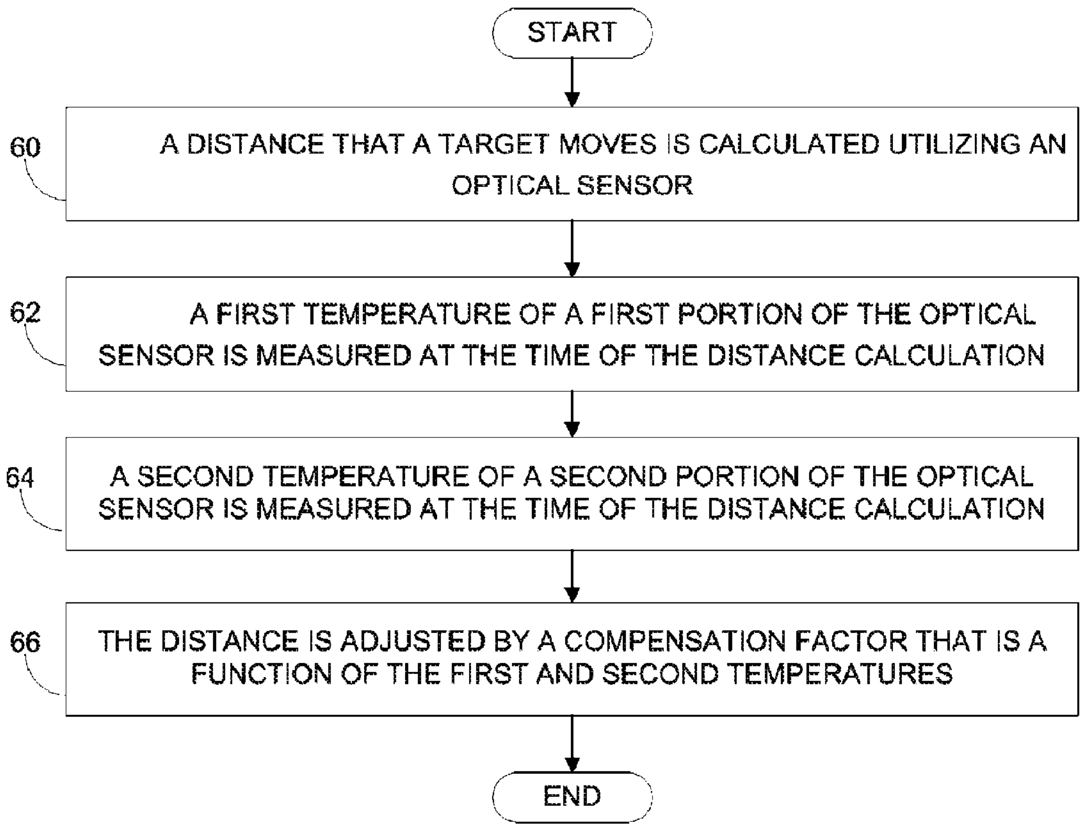
FIGS. 4-5 are exemplary flow diagrams of steps taken to adjust distance calculations according to various embodiments.
Figure 5:
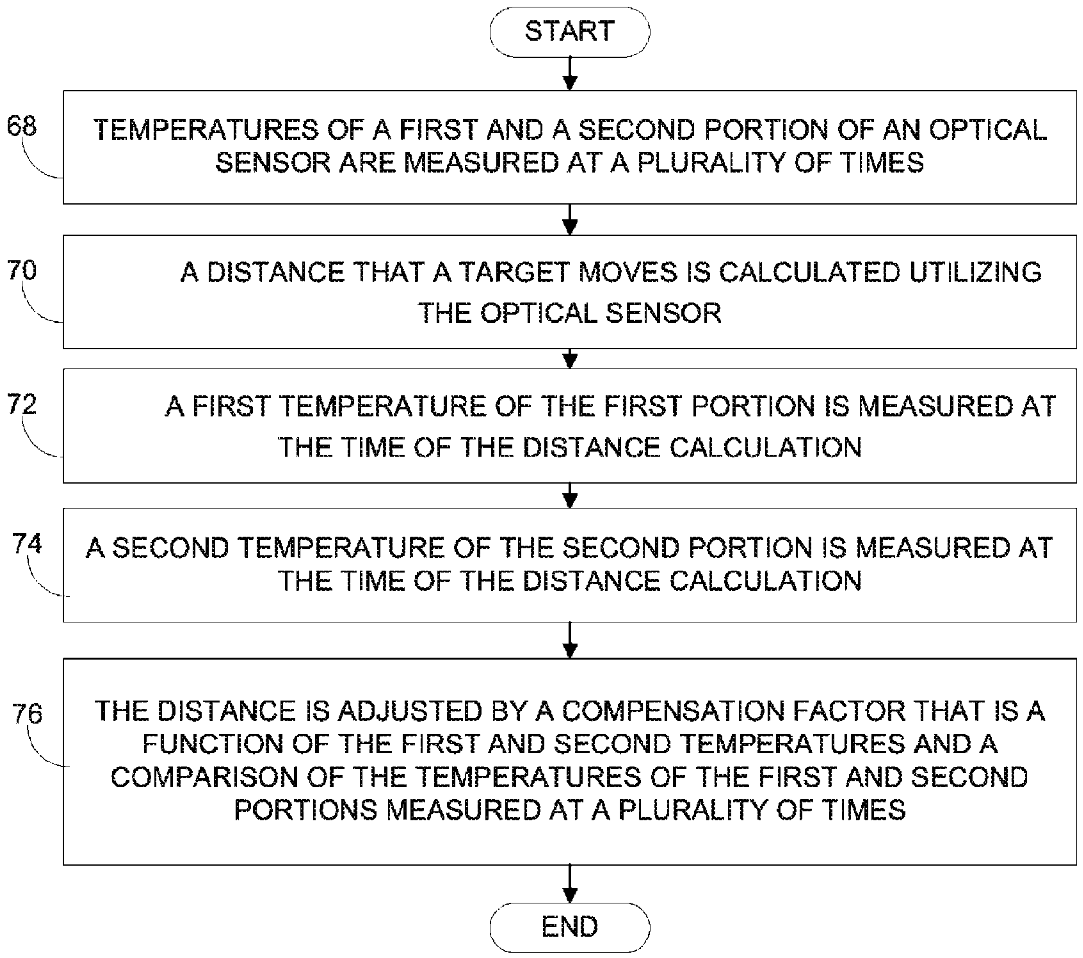

FIGS. 4-5 are exemplary flow diagrams of steps taken to adjust distance calculations according to various embodiments. In discussing FIGS. 4-5, reference may be made to the diagrams of FIGS. 1-2 and the chart of FIG. 3 to provide contextual examples. Implementation, however, is not limited to those examples.

Starting with FIG. 4, a distance that a target moves is calculated utilizing an optical sensor (step 60). Referring back to FIG. 1, the controller 20 may be responsible for implementing step 60 utilizing images captured by optical sensor 18. Referring back to FIG. 2, the first controller 42 may be responsible for implementing step 60 utilizing images captured by optical sensor 18. In an embodiment, calculating the distance that the target moves may include the following steps: a first image of the target is captured by the optical sensor; a second image of the target is captured by the optical sensor at a known interval; and the distance that the target moves is calculated considering the first image, the second image, and the known interval. In an embodiment the calculation includes analyzing the first and second image to measure any movement of the target that is different from the known distance interval. In another embodiment, the known interval may be a time interval.

Continuing with the flow diagram of FIG. 4, a first temperature of a first portion of the optical sensor is measured at the time of the distance calculation (step 62). Referring back to FIG. 1-2, the first temperature sensor 12 may be responsible for implementing step 62. A second temperature of a second portion of an optical sensor is measured at the time of the distance calculation (step 64). Referring back to FIG. 1-2, the second temperature sensor 36 may be responsible for implementing step 64.

Continuing with the flow diagram of FIG. 4, the distance is adjusted by a compensation factor that is a function of the first and second temperatures (step 66). Referring back to FIG. 1, the controller 20 may be responsible for implementing step 66. Referring back to FIG. 2, the second controller 44 may be responsible for implementing step 66.

The compensation factor should take into account that deformation of the optics may be not be uniform, and that the deformation can be predicted in light of the first and second temperature measurements. At least two phenomena may change magnification in an optical system: non-uniform thermal expansion of distances along the optical axis, and the lenses changing their refractive index or curvature by temperature. While the type and degree of such optics deformation may vary depending upon the thermal state that the optical sensor is in, it is possible to utilize an approximation that does not consider multiple thermal states to simplify implementation. In one example, a linear compensation factor (CF) may be used $CF=A\cdot(T_u-\epsilon\cdot T_b)+B$. where $T_u$ is the temperature in first portion of optical sensor, $T_b$ is the temperature in second portion of optical sensor, and A, B and $\epsilon$ are constants for stateless approximation.

Moving on to FIG. 5, in a particular implementation, temperatures of first and a second portion of an optical sensor are measured at a plurality of times (step 68). Referring back to FIG. 1-2, the first temperature sensor 12 and second temperature sensor 36 may be utilized together to implement step 68 with the first temperature sensor 12 measuring temperatures of the first portion and the second temperature sensor 36 measuring temperatures of the second portion. In an embodiment, temperatures of the first and second portion are measured at all times that a device which incorporates the optical sensor is powered on, so as to provide temperature measurements during all phases of operation of the device and to be able to determine relevant thermal states.

Continuing with FIG. 5, a distance that a target moves is calculated utilizing the optical sensor (step 70). Referring back to FIG. 1, the controller 20 may be responsible for implementing step 70 utilizing images captured by optical sensor 18. Referring back to FIG. 2, the first controller 42 may be responsible for implementing step 70 utilizing images captured by optical sensor 18. A first temperature of a first portion of an optical sensor is measured at the time of the distance calculation (step 72). Referring back to FIG. 1-2, the first temperature sensor 12 may be responsible for implementing step 72. A second temperature of a second portion of an optical sensor is measured at the time of the distance calculation (step 74). Referring back to FIG. 1-2, the second temperature sensor 36 may be responsible for implementing step 74.

Continuing with the flow diagram of FIG. 5, the distance is adjusted by a compensation factor that is a function of the first and second temperatures and a comparison of the temperatures of the first and second portions measured at a plurality of times (step 76). Referring back to FIG. 1, the controller 20 may be responsible for implementing step 76. Referring back to FIG. 2, the second controller 44 may be responsible for implementing step 76. As the type and degree of such optics deformation may vary depending upon a thermal state that the optical sensor is in, it is possible to consider thermal states in the compensation factor to increase efficiency in adjusting distance calculations. Referring back to FIG. 3, a compensation factor that is a function of the first and second temperatures and a comparison of the temperatures of the first and second portions measured at a plurality of times may consider the thermal states described in FIG. 3. In one example, compensation factors for a first transient state, a steady state and a second transient state may be created and held in memory. A distance may be adjusted utilizing the compensation factor that is appropriate for thermal state that the optical sensor is in that state at the time that the distance is calculated. In an example, if the optical sensor is in the first transient state at the time the distance is calculated, the distance may be adjusted by a compensation factor that is created specifically for that first transient state.

In one example, a compensation factor for a first transient state is developed:

$$CF_{TR1}(T_u, T_b) = K_1 \cdot \frac{d}{dt}(T_u - T_b) + D_1, \text{ where } \frac{d}{dt}$$

is time derivative, $T_u$ is the temperature in first portion of optical sensor, $T_b$ is the temperature in second portion of optical sensor, and $K_1$, and $D_1$ are constants. Such a compensation factor considers that optics magnification in this first transition state is changing mainly due to different expansions in the first portion and the second portion. Such a compensation factor also considers that the biggest magnification change occur at the beginning of this thermal state, when $T_u$-$T_b$ changes most rapidly.

In one example, a compensation factor for a steady state is developed: $CF_{SS}(T_u,T_b)=K_s\cdot T_u+D_s$, where $T_u$ is the temperature in first portion of optical sensor, $T_b$ is the temperature in second part of optical sensor, and $K_s$, and $D_s$ are constants. Such a compensation factor considers that while the optics' focal distances may not change significantly in the steady state, the optics lenses' refractive index and curvature may still be changing, at a rate proportional to that of temperatures $T_b$ or $T_u$.

In one example, a compensation factor for a second transient state, after a device's operation is stopped and resumed, is developed $$CF_{TR2}(T_u, T_b) = K_2 \cdot \frac{d}{dt}(T_u - T_b) + D_2, \text{ where } \frac{d}{dt}$$

is time derivative, $T_u$ is the temperature in first portion of optical sensor, $T_b$ is the temperature in second portion of optical sensor, and $K_2$, and $D_2$ are constants. Such a compensation factor is similar to the compensation factor for the first transient state, but the second transient state starts at higher temperatures than the first transient state, and with $T_b$ very close to $T_u$ throughout as compared to the first transient state.

Although the flow diagrams of FIG. 4-5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the preceding description.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method, comprising:

calculating a distance that a target moves utilizing an optical sensor;

measuring a first temperature of a first portion of the optical sensor at the time of the distance calculation;

measuring a second temperature of a second portion of the optical sensor at the time of the distance calculation; and adjusting the distance by a compensation factor that is a function of the first and second temperatures.

2. The method of claim 1, wherein the target is a region of media advancing through a printer.

3. The method of claim 1, wherein calculating a distance that a target moves utilizing an optical sensor comprises:

the optical sensor capturing a first image of the target;

the optical sensor capturing a second image of the target at a known interval; and calculating a distance that the target moves considering the first image, the second image and the known interval.

4. The method of claim 1, further comprising measuring a plurality of temperatures of the first and second portions at a plurality of times; and wherein the compensation factor is also a function of a comparison of the plurality of measured temperatures of the first portion to the plurality of measured temperatures of the second portion.

5. The method of claim 4, wherein the compensation factor considers a thermal state of the optical sensor in effect at the time the distance is calculated.

6. The method of claim 5, wherein the thermal state is determined considering a comparison of rates of temperature change within the first and second portions.

7. The method of claim 5, wherein the thermal state is determined considering a previous thermal state.

8. The method of claim 5, wherein the thermal state is one of:

a first transient state;

a steady state; or a second transient state.

9. A system, comprising:

an optical sensor to be used in calculating a distance that a target moves;

a first temperature sensor to measure a first temperature of a first portion of the optical sensor at the time of the distance calculation;

a second temperature sensor to measure a second temperature of a second portion of the optical sensor at the time of the distance calculation; and a controller electronically coupled to the optical sensor and to the first and second temperature sensors, the controller to adjust the distance by a compensation factor that is a function of the first and second temperatures.

10. The system of claim 9, wherein the first temperature sensor is coupled to the optical sensor.

11. The system of claim 9, wherein the first temperature sensor is embedded in the optical sensor.

12. The system of claim 9, wherein the first temperature sensor is external to the optical sensor.

13. The system of claim 9, wherein the second temperature sensor is embedded in the optical sensor.

14. The system of claim 9, wherein the second temperature sensor is coupled to the optical sensor.

15. The system of claim 9, wherein the second temperature sensor is external to the optical sensor.

16. The system of claim 9, wherein the first temperature sensor is configured to measure a plurality of temperatures of the first portion at a plurality of times;

the second temperature sensor is configured to measure a plurality of temperatures of the second portion at a plurality of times; and the compensation factor is also a function of a comparison of the plurality of measured temperatures of the first portion to the plurality of measured temperatures of the second portion.

17. A printer, comprising:

an optical sensor to be used in calculating a distance that a media moves;

a first temperature sensor to measure a first temperature of a first portion of the optical sensor at the time of the distance calculation;

a second temperature sensor to measure a second temperature of a second portion of the optical sensor at the time of the distance calculation; and a controller electronically coupled to the optical sensor and to the first and second temperature sensors, the controller to adjust the distance by a compensation factor that is a function of the first and second temperatures.

18. The printer of claim 17, wherein the first temperature sensor is configured to measure a plurality of temperatures of the first portion at a plurality of times;

the second temperature sensor is configured to measure a plurality of temperatures of the second portion at a plurality of times; and the compensation factor is also a function of a comparison of the plurality of measured temperatures of the first portion to the plurality of measured temperatures of the second portion.

19. The printer of claim 18, wherein the compensation factor considers a thermal state of the optical sensor in effect at the time the distance is calculated.

20. The printer of claim 18, wherein the thermal state is determined considering a comparison of rates of temperature change within the first and second portions.

* * * * *